(12) United States Patent
Parker

(10) Patent No.: US 11,186,128 B2
(45) Date of Patent: Nov. 30, 2021

(54) DISPOSABLE TIRE GRIPPING SYSTEM

(71) Applicant: G. R. Parker, Hanna, UT (US)

(72) Inventor: G. R. Parker, Hanna, UT (US)

( * ) Notice: Subject to any disclaimer, the term of this patent is extended or adjusted under 35 U.S.C. 154(b) by 11 days.

(21) Appl. No.: 16/010,435

(22) Filed: Jun. 16, 2018

(65) Prior Publication Data

US 2019/0381842 A1 Dec. 19, 2019

(51) Int. Cl.
*B60C 27/02* (2006.01)
*B60C 27/00* (2006.01)

(52) U.S. Cl.
CPC ........ *B60C 27/0269* (2013.01); *B60C 27/003* (2013.01); *B60C 27/0238* (2013.01)

(58) Field of Classification Search
CPC ....... B60C 27/00; B60C 27/003; B60C 27/02; B60C 27/0238; B60C 27/0261; B60C 27/0269; B60C 27/0276; B60C 27/08; B25B 27/22

See application file for complete search history.

(56) References Cited

U.S. PATENT DOCUMENTS

| | | | |
|---|---|---|---|
| 1,283,729 A | 11/1918 | Ginley | |
| 1,719,746 A * | 7/1929 | Baker | B60C 27/02 152/222 |
| 2,058,799 A * | 10/1936 | Jacks | B60C 27/16 152/221 |
| 2,423,759 A | 7/1947 | Edwards | |
| 2,540,230 A | 2/1951 | Andrews | |
| 2,679,882 A * | 6/1954 | Christopher | B60C 27/02 152/222 |
| 2,685,903 A * | 8/1954 | Lutey | B60C 27/0276 152/222 |
| 2,696,237 A | 12/1954 | Doughty | |
| 2,936,016 A | 5/1960 | Stack | |
| 3,107,714 A * | 10/1963 | Zeitlin | B60C 27/0276 152/222 |
| 3,506,051 A | 4/1970 | Mathews | |
| 4,036,273 A | 7/1977 | Kemper | |
| 4,155,388 A | 5/1979 | Rajcic | |
| 4,269,249 A | 5/1981 | McLean | |
| 4,334,569 A * | 6/1982 | Jacob | B60C 27/02 152/218 |
| 4,402,357 A * | 9/1983 | Granryd | B60C 27/04 152/216 |
| 4,598,749 A | 7/1986 | Madekic | |
| 5,454,412 A * | 10/1995 | Bowers | B60C 27/02 152/208 |
| 6,708,746 B2 * | 3/2004 | Wilkinson | B60C 27/04 152/221 |
| 8,141,605 B2 | 3/2012 | Park | |
| 8,807,665 B2 * | 8/2014 | Perry | B60B 15/00 301/44.1 |
| 8,979,213 B2 * | 3/2015 | Curry | B60C 27/0223 152/181 |
| 9,694,635 B2 * | 7/2017 | Curry | B60C 27/20 |
| 2004/0226640 A1 * | 11/2004 | Woodworth | B60C 27/00 152/217 |

* cited by examiner

*Primary Examiner* — Jason R Bellinger
(74) *Attorney, Agent, or Firm* — Marcus G. Theodore

(57) ABSTRACT

A plurality of disposable single fabricated piece tire grips with friction contact surfaces and cable ties ratchet mounted on wheel contact surfaces of tires mounted on wheels with openings allowing the grips to secure there through for easy application and fits all tires regardless of size.

5 Claims, 5 Drawing Sheets

DISPOSABLE TIRE GRIPPING SYSTEM

BACKGROUND OF THE INVENTION

Field

This invention pertains to tire gripping systems. More particularly, it pertains to a plurality of disposable single fabricated piece tire grips with friction contact surfaces and cable ties ratchet mounted on wheel contact surfaces of tires mounted on wheels with openings allowing the grips to secure there through for easy application and fits all tires regardless of size.

State of the Art

Various traction augmenting tire grip systems are known. Kember, U.S. Pat. No. 4,036,273 issued Jul. 19, 1977 discloses traction augmenting road grips employing a plurality of traction augmenting ribs placed around a vehicle tire and held with side arms secured around the wheel with an interconnected linkage fastening system. These linkages are costly to make and take time to mount on a wheel.

Mathews, U.S. Pat. No. 3,506,051 issued Apr. 14, 1970 discloses another traction increasing device using a plurality of equal segmented rings with stud bolds spaced equally apart and held on the tire with a plurality of spokes secured at their inner ends to a coaxial ring via the bolts. Again this costly structure takes significant time to mount on a wheel, and requires an axle wheel mount.

Andrews, U.S. Pat. No. 2,540,230 issued Feb. 6, 1951 discloses an antiskid device for motor vehicle tires employing a plurality of L-shaped interconnected members of vulcanized rubber positioned along the surface of a tire and held via a netting system of flexible wire or cable. This complex interconnected system is difficult to apply and is subject to failure if the interconnected members separate.

Doughty, U.S. Pat. No. 2,696,237 issued Dec. 7, 1954 discloses a tire lug system employing J-shaped tire lugs, which hook over the tread of a tire and are held in place via an interconnecting spring system. These tire lugs are easier to apply, but are subject to flexing as the tension on the spring system changes during operation.

Edwards, U.S. Pat. No. 2,423,759 issued Jul. 8, 1947 discloses a Mud Hook System employing a plurality of hooks with U-shaped portions on the inside of the tire, and a hook on the exterior, which are interconnected by exterior cable webs to secure the mud hooks about the tire. These mud hooks must be ratcheted in place to apply tension to insure the hooks do not come off during operation. They thus require the application of sufficient tension to prevent them from releasing during operation.

Stack, U.S. Pat. No. 2,936,016 issued May 10, 1960 discloses an anti-skid device employing a plurality of J-shaped traction elements secured about the tire surface and held together with an exterior tire locking system. This complex locking system takes time to mount onto a tire and is subject, to mechanical linkage failure.

Park, U.S. Pat. No. 8,141,605 issued Mar. 27, 2012 discloses a device for preventing slipping of a vehicle employing a plurality of spikes connected with a connection member inserted into the gap between double wheels of a large size vehicle. The device is not useful for single wheels, and is difficult to apply requiring the application of tension to secure the spikes.

Rajcic et al, U.S. Pat. No. 4,155,388 issued May 22, 1979 discloses a plurality of traction devices positioned transversely in spaced relation on a tire tread. These U-shaped traction devices are interconnected to other opposite corresponding U-shaped traction devices on the other side of the tire held with chains or cables, etc. They are subject to release or slippage if the connecting tension releases.

Cited for general interest are:
Madekic, U.S. Pat. No. 4,598,749 issued Jul. 8, 1986 disclosing a vehicle tire with traction means.
McLean, U.S. Pat. No. 4,269,249 issued May 26, 1981 disclosing tire chains and a tool for applying them to a tire.
Ginley, U.S. Pat. No. 1,283,729 issued Nov. 5, 1918 disclosing a chain tightener.

None of the foregoing discloses a disposable tire chain grip for use with all tires, regardless of size employing a plurality of grips secured about a tire surface via cable tie ends passing through openings in a mounted tire wheel and secured thereabout. The device disclosed below provides such an invention.

BRIEF SUMMARY OF THE INVENTION

The invention is a single fabricated piece tire gripping system for tire mounted wheel with holes that is easy to apply and fits all tires regardless of size. It comprises a plurality of disposable tire grips each having a friction road contact section covering a segment of an inflated tire, and opposing ends structured as cable tie ends (also known as a hose tie, steggel tie, zap strap or zip tie, and by the brand names Ty-Rap and Panduit strap).

The friction road contact section includes rows of nubs normal the tire surface to penetrate and grip snow or mud covered roads. These nubs may include metal spikes to penetrate ice.

The opposing ends are of a length to secure around the sides of a tire mounted on a wheel with openings structured to pass through its openings for the opposite ends of the cable tie ends to connect together.

The tire grips may be made of flexible rugged plastic, or metal. In stainless steel versions, either naked or coated with a rugged plastic, cater for exterior applications and hazardous environments. Alternatively, they may be made of a biodegradable material which dissolves after the tire grip is removed from the tire.

The ends structured as common cable ties are normally made of nylon and have a flexible tape section with teeth or holes that engage with a pawl in the head of the opposite end to form a ratchet so that as the free end of the tape section is pulled the cable tie tightens and does not come undone. Some reusable ties may include a tab that can be depressed to release the ratchet so that the tie can be loosened or removed, and possibly reused.

The tire gripping system may be packaged as a kit including eight grips, a metal bar cincher, and hand wipes or gloves to clean hands after tire mounting. Eight grips allows the placement of 2 on each drive wheel of a four wheel drive vehicle, or 4 on each of the drive wheels of a two wheel drive vehicle. These grips are usually mounted equidistant from each other on opposite sides of the wheels.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the disposable tire chain grip for use with all tires, regardless of size employing a plurality of grips secured about a tire surface via cable tie ends of the present invention, as represented in FIGS. 1 through 6, is not intended to limit the scope of the invention, as claimed, but is merely representative of presently preferred embodiments of the invention.

Figure 1:
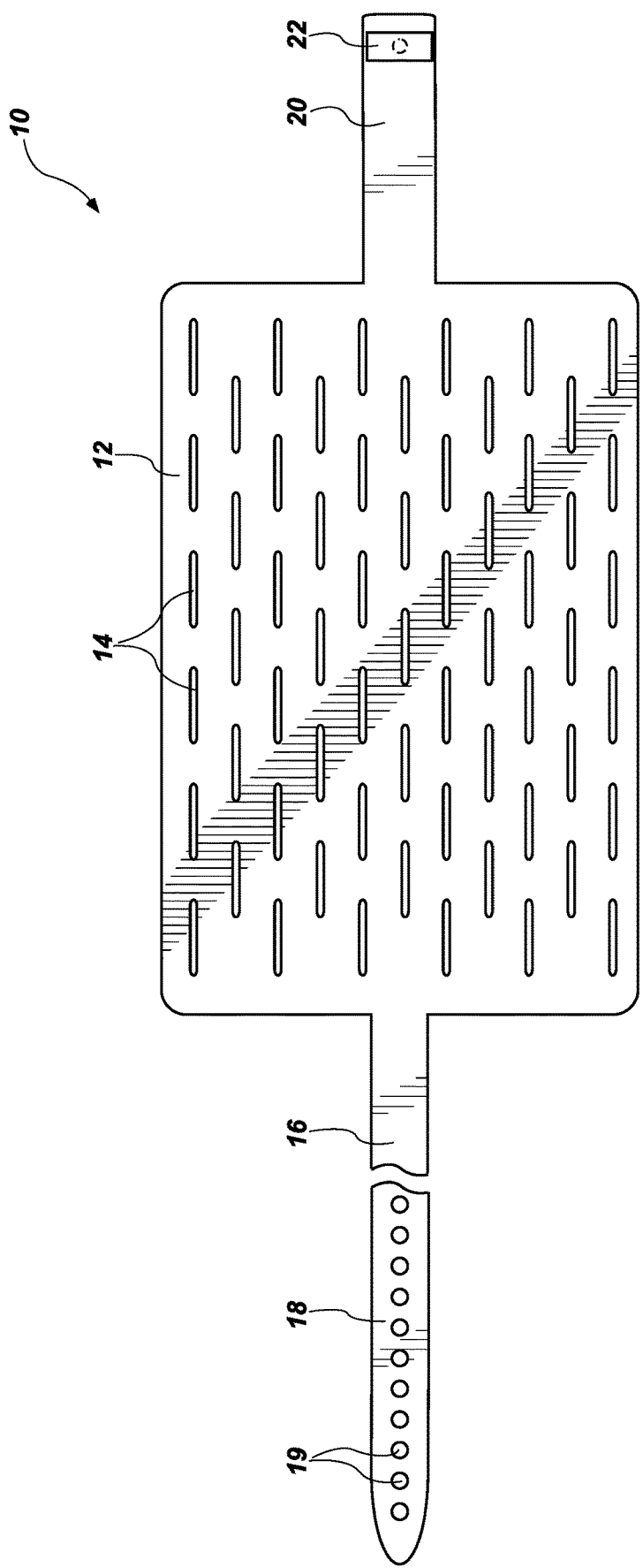
FIG. 1 is a top view of an embodiment of the invention.

FIG. 1 is a top view of an embodiment of the invention 10. The invention comprises at least one tire grip 10 having a friction gripping section 12 with nubs 14 sometimes positioned in a parallel off-set pattern as shown. The gripping section 12 and nubs 14 are mounted on the contact surface of a tire to provide additional surface contact traction with the road. The friction gripping section 12 has ends 16 structured as common cable ties normally made of nylon with a flexible tape section 18 with holes 19 that engage opposed ends 20 structured as a pawl 22 in the head to form a ratchet (not shown) so that as the free end 16 of the tape section 18 passes through openings in the wheel and is pulled through the pawl 22, the pawl 22 engages the holes 19 of the cable tie to tighten about the tire and does not come undone.

A minimum of two tire grips 10 per drive wheel are installed to provide sufficient friction for snow and mud driving. However, for two wheel drive, usually four tire grips 10 per drive wheel are installed vs. two tire grips 10 per drive wheel for four wheel drive. Hence, a pack of eight tire grips 10 is usually carried in a vehicle.

The tire grips 10 may be removed after use by cutting the cable tie ends 16, or allowed simply allowed to fall off with wear.

Some reusable tire grips 10 may include a tab (not shown) that can be depressed to release the ratchet of the pawl 22 so that the tire grip 10 can be loosened or removed for possible reuse.

Figure 2:
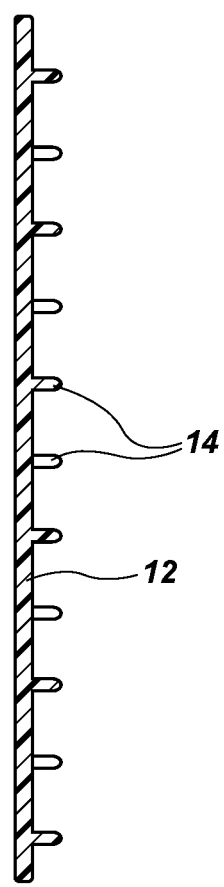
FIG. 2 is a side view of the embodiment of the invention shown in FIG. 1.

FIG. 2 is a side view of the embodiment of the invention shown in FIG. 1. The nubs 14 are approximately ¼" in height. The gripping section 12 is approximately ¹⁄₁₆" in thickness, and is 3" to 4½" wide.

Figure 3:
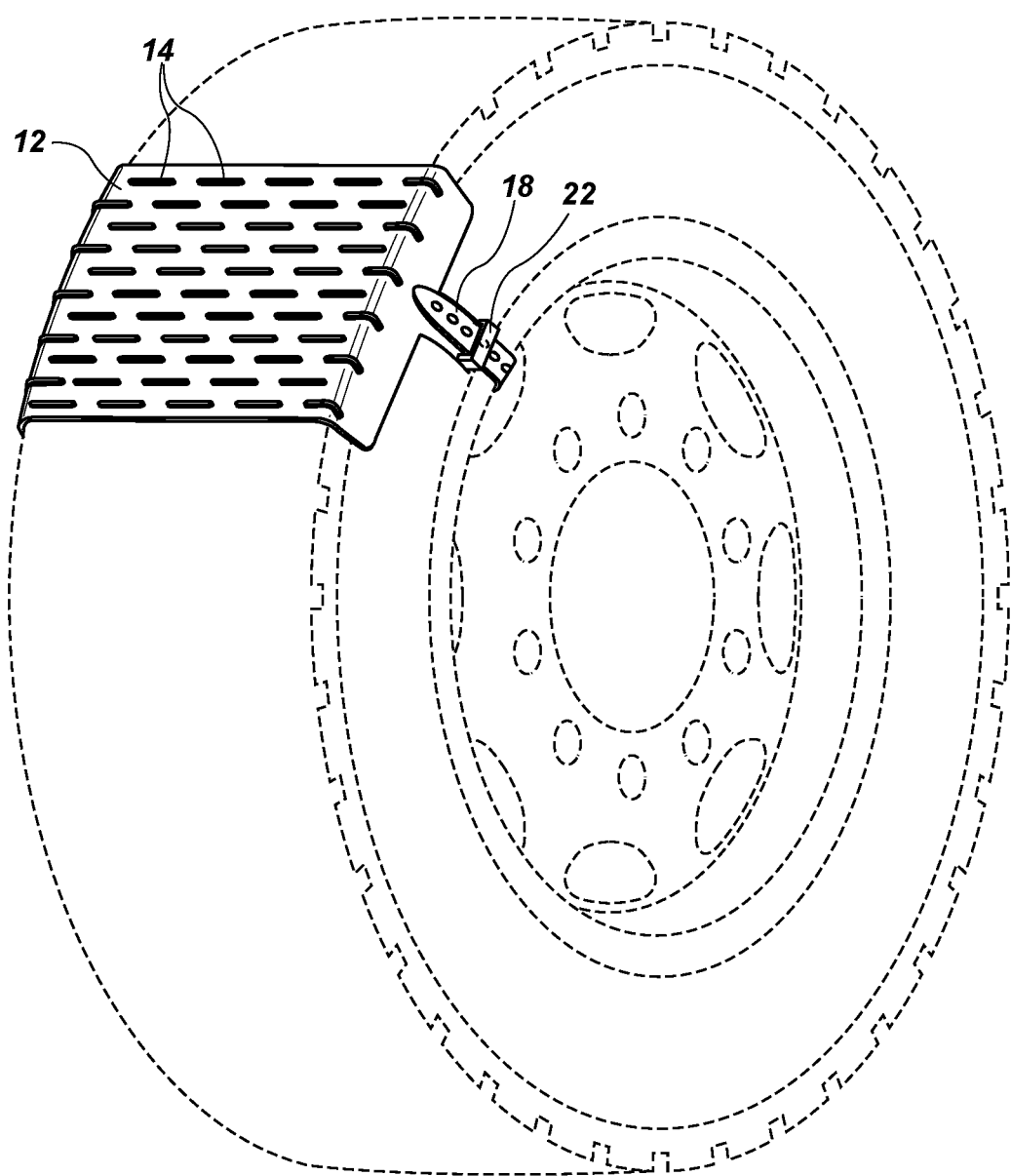
FIG. 3 is a side view of a tire mounted with the embodiment of FIG. 1.

FIG. 3 is a side view of a tire mounted on a wheel with openings through which the embodiment of FIG. 1 passes through for securing.

Figure 4:
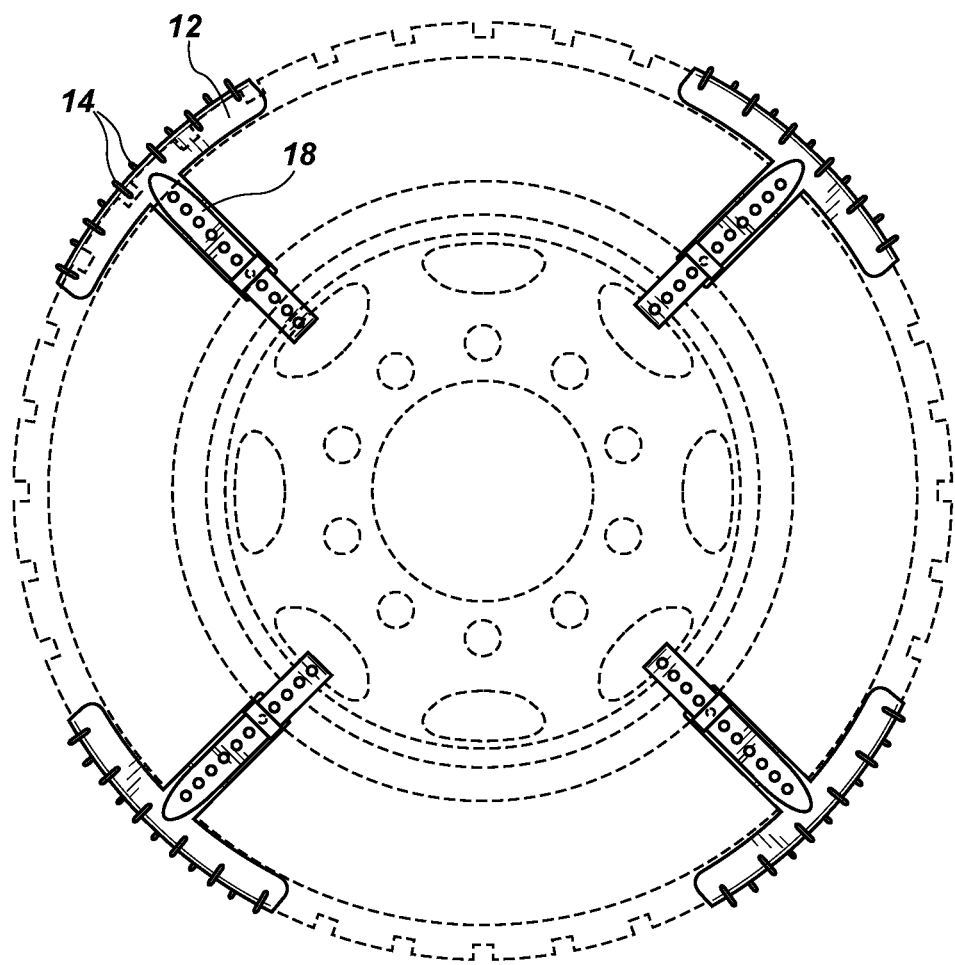
FIG. 4 is a side sectional view of the embodiment of FIG. 3.

FIG. 4 is a side view of a tire with four embodiment of FIG. 3 attached.

Figure 5:
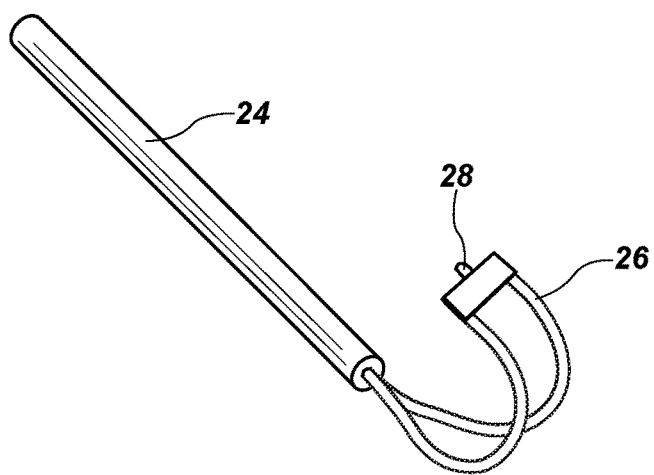
FIG. 5 is perspective view of a tightening iron.

FIG. 5 is perspective view of a cinching bar 24 with a J shaped lever end 26 with a gripping spike 28 sized to fit within holes 19 of the flexible tape section 18.

Figure 6:
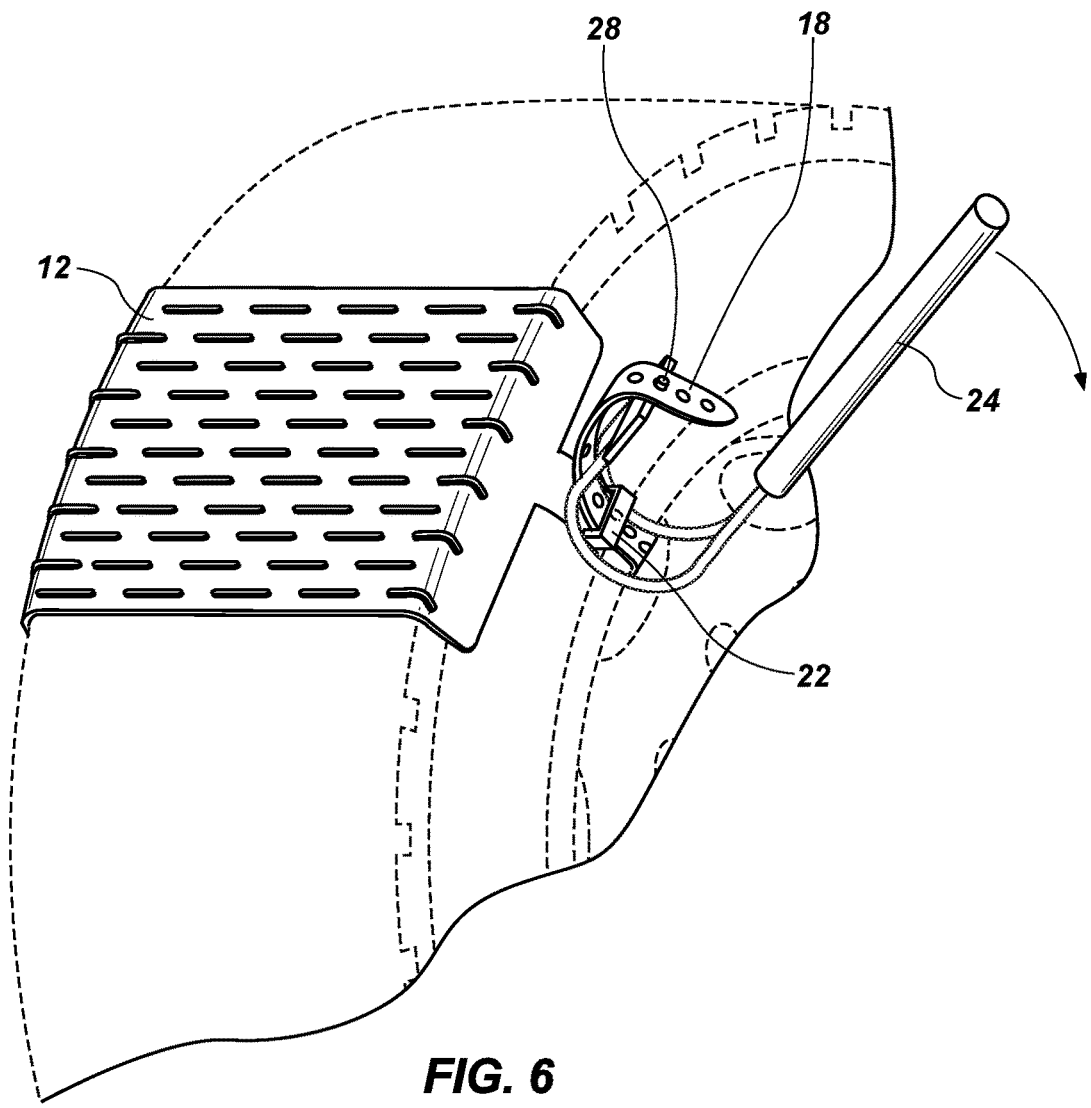
FIG. 6 is a perspective view of the tightening iron securing the embodiment of the invention shown in FIG. 1 to a tire.

FIG. 6 is a perspective view of the cinching bar 24 tightening the embodiment of the invention shown in FIG. 1 to a tire.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

I claim:

1. A tire grip for tires with surface treads mounted on wheel with openings comprising:
   a. at least one tire grip having
      i. a friction gripping section with nubs sized to cover a segment of the contact surface of the tire to provide additional surface contact traction with the road,
      ii. opposing first and second ends affixed on both sides of the gripping section with the first ends structured as cable ties with a flexible tape section with holes that engage corresponding opposed second ends structured as a pawl in a head to form a ratchet to secure to the first end of the tape section for tightening about the tire; said ends of a length to pass around the tire through the openings in the wheel to secure the first and second ends together.

2. The tire grip according to claim 1, wherein the friction gripping section nubs are positioned in a parallel off-set pattern normal the surface treads of the tire.

3. The tire grip according to claim 1, including a cinch bar shaped with a handle attached to a lever end structured to secure to the holes in the flexible tape section to pull the flexible tape section through the pawl about the tire.

4. The tire grip according to claim 1, wherein the tire grip is constructed of a biodegradeable material, which dissolves after the tire grip is removed from the tire.

5. The tire grip kit for tires with surface treads mounted on wheel with openings comprising:
   a. at least one tire biodegradeable grips, which dissolves after the tire grip is removed from the tire, each having
      i. a friction gripping section with nubs sized to cover a segment of the contact surface of the tire to provide additional surface contact traction with the road,
      iii. opposing first and second ends affixed on both sides of the gripping section with the first ends structured as cable ties with a flexible tape section with holes that engage corresponding opposed second ends structured as a pawl in a head to form a ratchet to secure to the first end of the tape section for tightening about the tire; said ends of a length to pass around the tire through the openings in the wheel to secure the first and second ends together, b. a cinch bar shaped with a handle attached to a lever end structured to secure to the holes in the flexible tape section to pull the flexible tape section through the pawl to hold about the tire.

\* \* \* \* \*